(12) United States Patent
Heinemeier

(10) Patent No.: US 8,978,880 B2
(45) Date of Patent: Mar. 17, 2015

(54) ACCUMULATING CONVEYOR SYSTEM

(75) Inventor: Thomas E. Heinemeier, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 221 days.

(21) Appl. No.: 13/347,789

(22) Filed: Jan. 11, 2012

(65) Prior Publication Data
US 2013/0175141 A1 Jul. 11, 2013

(51) Int. Cl.
*B65G 13/07* (2006.01)

(52) U.S. Cl.
USPC .................. 198/783; 198/781.04; 198/781.06

(58) Field of Classification Search
CPC ..................................................... B65G 13/06
USPC ............. 198/781.01–781.06, 781.08, 781.09, 198/781.1, 783
See application file for complete search history.

(56) References Cited

U.S. PATENT DOCUMENTS

| | | | | |
|---|---|---|---|---|
| 4,505,381 A | * | 3/1985 | Major ...................... | 198/781.02 |
| 4,668,110 A | * | 5/1987 | /E/ geto et al. ................ | 384/536 |
| 5,161,673 A | * | 11/1992 | Cairns ...................... | 198/781.04 |
| 5,392,899 A | * | 2/1995 | Wakabayashi ................ | 198/780 |
| 5,540,323 A | * | 7/1996 | Schiesser et al. ........ | 198/781.06 |
| 5,558,205 A | * | 9/1996 | Helgerson et al. ....... | 198/781.04 |
| 5,558,206 A | * | 9/1996 | Helgerson et al. ....... | 198/781.04 |
| 5,810,157 A | * | 9/1998 | Nolan ...................... | 198/781.04 |
| 6,719,125 B1 | * | 4/2004 | Hollander ................ | 198/781.03 |
| 7,104,395 B2 | * | 9/2006 | Brown et al. ............. | 198/781.06 |
| 7,503,450 B2 | * | 3/2009 | Helgerson et al. ....... | 198/781.04 |
| 7,748,520 B1 | * | 7/2010 | Helgerson et al. ....... | 198/781.03 |
| 8,123,014 B2 | * | 2/2012 | Wooden ................... | 192/48.613 |
| 8,371,435 B2 | * | 2/2013 | Agnoff ..................... | 198/781.03 |

FOREIGN PATENT DOCUMENTS

| | | |
|---|---|---|
| DE | 3017942 C2 | 12/1981 |
| DE | 3720609 A1 | 1/1989 |
| FR | 1380687 A | 10/1963 |

* cited by examiner

*Primary Examiner* — Gene Crawford
*Assistant Examiner* — Thomas Randazzo

(57) ABSTRACT

A conveyor system includes pulleys spaced mutually along a length of the conveyor system; and roller assemblies, each roller assembly aligned with one of the pulleys, including a first ring driveably connected to one of the pulleys, a second ring surrounding the first ring, and a third ring located radially between and contacting the first and second rings, and alternately transmitting rotary motion from the first ring to the second ring and discontinuing said transmission of rotary motion depending on presence and absence of frictional engagement between the third ring and at least one of the first ring and the second ring.

11 Claims, 3 Drawing Sheets

US 8,978,880 B2

ACCUMULATING CONVEYOR SYSTEM

BACKGROUND OF INVENTION

This invention relates generally to a stationary accumulating trolley conveyor system for use during high volume production of components carried on skids.

During high volume automated production in the automotive industry, buffer belts, the industry standard, are used to accumulate skids through the body, paint and general assembly shop. The skids support components being carried between work stations. Due to differences in the cycle time at the work stations, accumulation of the skids on the conveyor is required.

In conventional practice, trolleys are attached to a belt, which moves beneath the skids. Trolleys have free rolling wheels, which engage each skid. When a skid comes to a stop against a barrier or another skid, the roller and belt continue to move, and skids accumulate on the conveyor. Buffer belt trolley failure may result due to high side load forces that are generated between the buffer belt trolley and the bottom of the skid.

Attachment of a trolley to the belt is undesirable due to the elasticity of the belt. Failure of an individual trolley presents difficulty in its replacement and often leads to damage to the belt attached to the failed trolley. Belt installation requires special tools for maintenance. Current buffer belt conveyors have a relatively short service life cycle and trolleys are expensive.

A need exists in the industry for a conveyor system that employs stationary accumulating trolleys that eliminate the major problems of a conventional conveyor whose trolleys are attached to the belt.

SUMMARY OF INVENTION

A conveyor system includes pulleys spaced mutually along a length of the conveyor system; and roller assemblies, each roller assembly aligned with one of the pulleys, including a first ring driveably connected to one of the pulleys, a second ring surrounding the first ring, and a third ring located radially between and contacting the first and second rings, and alternately transmitting rotary motion from the first ring to the second ring and discontinuing said transmission of rotary motion depending on presence and absence of frictional engagement between the third ring and at least one of the first ring and the second ring. A belt drive transmits rotating power to one of the pulleys.

The conveyor system uses standard timing belts, reduces maintenance costs, improves reliability and durability compared to conventional conveyor systems, and provides the ability to couple a required number of rollers together as required for the number of skids to be accumulated on the conveyor.

The conveyor system can be assembled in modules that permit one modular skid accumulator to be coupled to another module.

Replacement of the sections of an existing belt drive accumulation system can be replaced readily with the preassembled stationary accumulation trolley.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
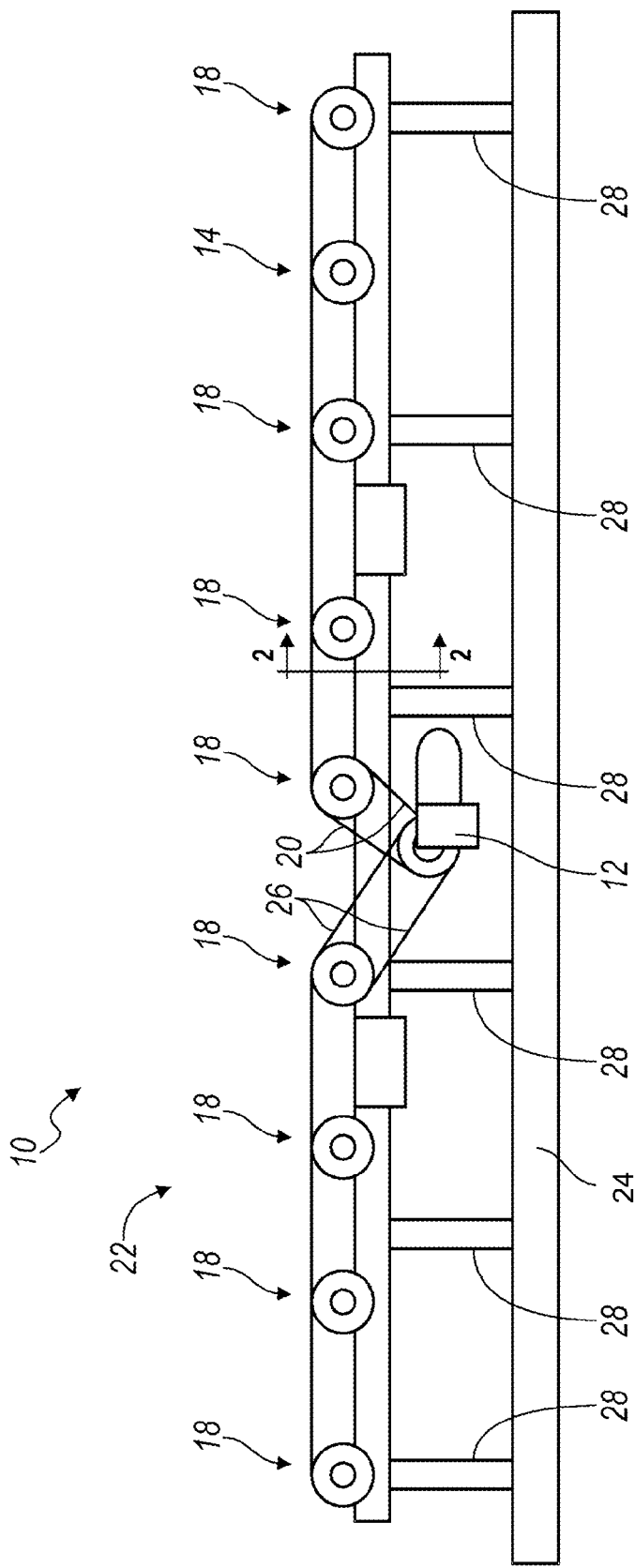
FIG. 1 is a schematic diagram showing a side view of an accumulating trolley conveyor system.

Referring now to FIG. 1, a stationary accumulating trolley conveyor system 10 includes a belt drive assembly 12; a first set 14 of roller and timing belt pulley assemblies 18 spaced mutually and extending rightward along the conveyor from the belt drive assembly 12; a first timing belt 20 engaged with the belt drive assembly 12 and each pulley of the first series of assemblies 18; a second set 22 of roller and timing belt pulley assemblies 18 spaced mutually and extending leftward along the conveyor system 10 from the belt drive assembly 12; and a second timing belt 26 engaged with the belt drive 12 and each pulley of the second set 22 of assemblies 18.

The conveyor system 10 is mounted on a floor 24 by an existing buffer belt structure 28.

Preferably the belt drive 12 can power approximately 28 friction rollers extending along the conveyor system 10 approximately 28 meters in length. More than one belt drive assembly 12 can be bolted together to match any conveyor length requirement.

Figure 2:
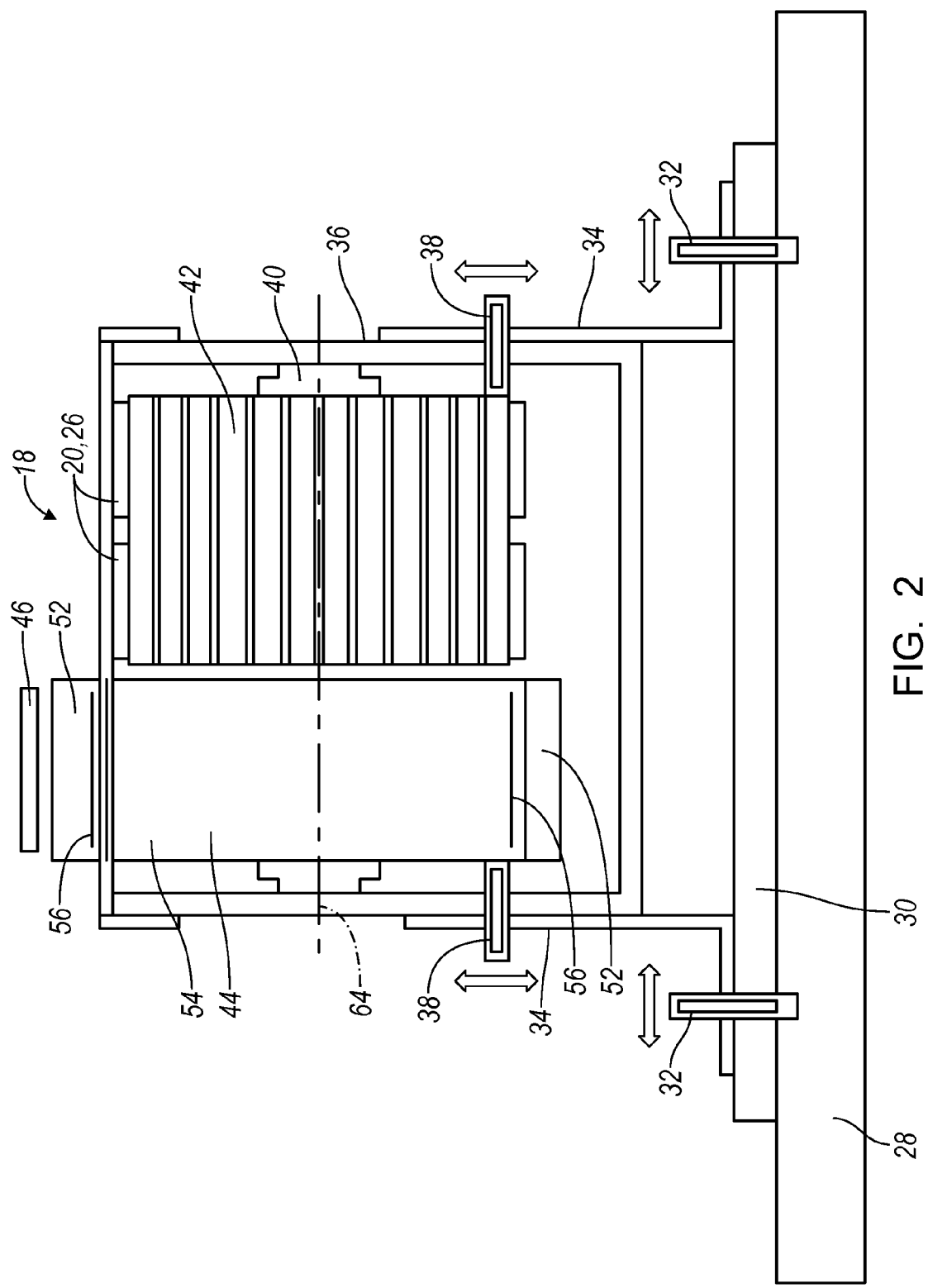
FIG. 2 is a schematic cross section through the conveyor system of FIG. 1 taken at plane 2-2 showing a side view of a stationary friction trolley.

FIG. 2 shows that each roller and timing belt pulley assembly 18 is supported on the existing buffer belt structure 28 by a plate 30, which is tapped for threaded engagement by bolts 32 connecting uprights 34 to the plate 30. The lateral distance between the uprights can be adjusted to suit the width of the roller and timing belt pulley assembly 18. Each upright 34 is connected by bolted attachments 38 to vertical U-channels 36, such that the elevation of the assembly 18 can be readily adjusted.

Each roller and timing belt pulley assembly 18 includes a shaft 40, which is supported on and extends between the U-channels 36 and rotates about an axis 64; a timing belt pulley 42 supported on shaft 40 and engaged with one of the timing belts 20, 26; and a roller assembly 44 supported of the shaft 40 and supporting a skid 46. The length of each skid 46 is greater than the distance between successive the roller assemblies 44, such that each skid 46 is supported concurrently on at least three roller assemblies.

Figure 3:
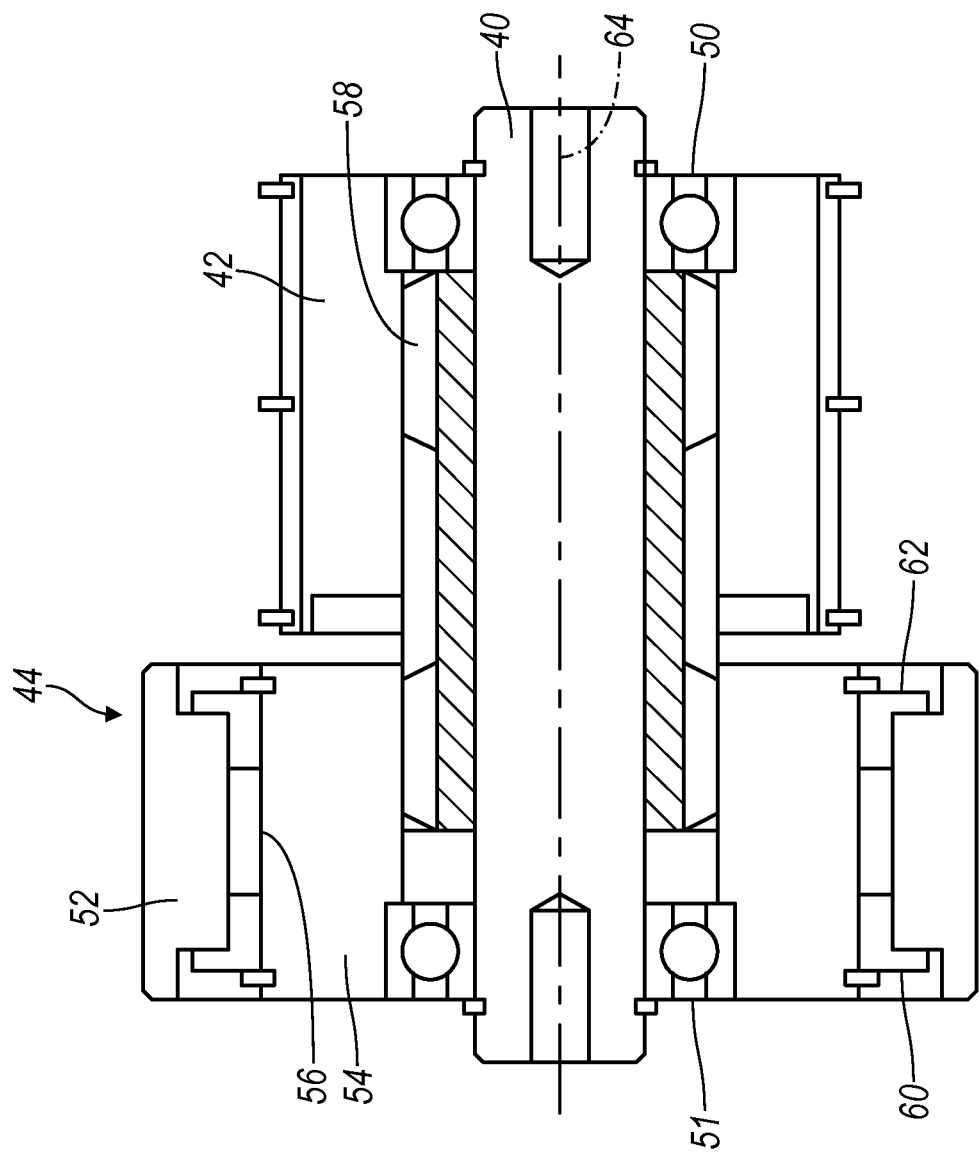
FIG. 3 is a cross sectional side view through a friction roller.

FIGS. 2 and 3 show that the timing belt pulley 42 and roller assembly 44 are supported on shaft 40 by bearings 50, 51. Each roller assembly 44 includes an outer ring 52, inner ring 54 and friction ring 56, and a drive connection, such as a sleeve shaft 58 that is connected to an inner surface of the timing belt pulley 42, which is connected to an inner surface of the inner ring 54. These connections may be made by splines, keys, bolts or press fittings. The friction ring 56 has laterally spaced shoulders 60, 62, which maintain the outer ring 52 centered on the inner ring 54.

The inner radial surface of friction ring 56 is secured mechanically, preferably by a press fit, to the outer radial surface of inner ring 54 such that the inner ring 54 continually transmits rotation to the friction ring 56 and those rings remain in driving contact despite loss of frictional contact between the friction ring 56 and the outer ring 52. Alternatively, the outer radial surface of friction ring 56 is secured mechanically, preferably by a press fit, to the inner radial surface of outer ring 52 such that the friction ring 56 and outer ring 52 remain in driving contact despite loss of frictional contact between outer radial surface of inner ring 54 and the inner radial surface of the friction ring 56.

Friction between the outer ring 52 and friction ring 56 or between the inner ring 54 and friction ring 56 is generated by the vertical skid load or roller assembly loading on the conveyor 10. Transferable rotational moment or torque is dependent on the roller load, i.e., the skid load. The frictional connection between the inner ring 54, friction ring 56 and outer ring 52 is proportional to the friction roller loading. Therefore, the magnitude of transferable rotational moment is proportional to the roller loading The friction ring 56 may be made of WF-GLX-1.5C plastic material. The dynamic coefficient of friction between the friction ring 56 and either the inner ring 54 or outer ring 52 may be in the range between 0.16 and 0.18. The static coefficient of friction between the friction ring 56 and either the inner ring 54 or outer ring 52 is preferably about 0.22.

The operation of the conveyor assembly will now be discussed with reference to FIGS. 1-3. In operation of the conveyor assembly 10 with the inner radial surface of friction ring 56 secured mechanically to the outer radial surface of inner ring 54, the belt drive 12 drives the friction rollers 44 in rotation due to their engagement with the timing belts 20, 26. When a skid 46 on the conveyor system 10 contacts a barrier of another skid, skids accumulate on the surface of the conveyor. The outer ring 52 stops rotating due to loss of rotational drive engagement between the friction ring 56 and the outer ring 52. The belt drive 12 continues to transmit rotating power to the inner ring 54. The inner ring 54 continues to rotate with the friction ring 56 relative to the outer ring 52, which is stopped.

In operation of the conveyor assembly 10 with the outer radial surface of friction ring 56 secured mechanically to the inner radial surface of outer ring 52, the belt drive 12 drives the friction rollers 44 in rotation due to their engagement with the timing belts 20, 26. When a skid 46 on the conveyor system 10 contacts a barrier of another skid, skids accumulate on the surface of the conveyor. The outer ring 52 and friction ring 56 stop rotating due to loss of rotational drive engagement between the inner ring 54 and friction ring 56. The belt drive 12 continues to transmit rotating power to the inner ring 54. The inner ring 54 continues to rotate relative to the friction ring 56 and outer ring 52, which are stopped.

While certain embodiments of the present invention have been described in detail, those familiar with the art to which this invention relates will recognize various alternative designs and embodiments for practicing the invention as defined by the following claims.

What is claimed is:

1. A conveyor system, comprising:
pulleys spaced mutually along a length of the conveyor system;
a belt drive for transmitting rotating power to at least one of the pulleys;
roller assemblies, each roller assembly aligned with one of the pulleys, and at least one of the roller assemblies including a rotationally fixed shaft centered about an axis, a sleeve shaft concentric with the shaft and rotationally fixed to the corresponding pulley, a first ring spaced axially from the corresponding pulley and concentric with and rotationally fixed to the sleeve shaft, a second ring surrounding the first ring, and a third ring located radially between and contacting the first and second rings, and alternately transmitting rotary motion from the first ring to the second ring and discontinuing said transmission of rotary motion depending on presence and absence of rotational drive engagement between the third ring and at least one of the first ring and the second ring; and
bearings supported on the shaft, each bearing supporting one of the pulley and the first ring for rotation on the shaft.

2. The conveyor system of claim 1, further comprising a drive belt engageable with the belt drive and the pulleys.

3. The conveyor system of claim 1, wherein said transmission of rotary motion is discontinued due to loss of rotational drive engagement between the second ring and the third ring.

4. The system of claim 1, wherein said transmission of rotary motion is discontinued due to loss of rotational drive engagement between the first ring and the third ring.

5. The conveyor system of claim 1, wherein the third ring is made of plastic material having a coefficient of friction in the range between about 0.15 and 0.22.

6. The conveyor system of claim 1, further comprising:
second pulleys spaced mutually and engageable by the belt drive; and
second roller assemblies, each second roller assembly aligned with one of the second pulleys and including a first ring driveably connected to said one of the second pulleys, a second ring surrounding the first ring, and a third ring located radially between and contacting the first and second rings, alternately permitting and preventing rotation of the second ring relative to the first ring depending on a magnitude of the rotational drive engagement between the third ring and the second ring.

7. A conveyor system, comprising:
rotatable pulleys spaced mutually along a length of the conveyor system;
roller assemblies, each roller assembly aligned with one of the pulleys, and at least one of the roller assemblies including a rotationally fixed shaft centered about an axis, a sleeve shaft concentric with the shaft and rotationally fixed to the corresponding pulley, a first ring spaced axially from the corresponding pulley and concentric with and rotationally fixed to the sleeve shaft, a second ring surrounding the first ring, and a third ring made of plastic material located radially between and contacting the first and second rings and alternately transmitting rotary motion from the first ring to the second ring and discontinuing said transmission of rotary motion depending on presence and absence of rotational frictional drive engagement between the third ring and the second ring; and
bearings supported on the shaft, each bearing supporting one of the pulley and the first ring for rotation on the shaft.

8. The conveyor system of claim 7, further comprising a belt drive engageable with the pulleys.

9. The conveyor system of claim 7, wherein the pulleys and belt drive are engageable by a timing belt, such that a rotational speed of the pulleys is substantially equal due to engagement by the timing belt.

10. The conveyor system of claim 7, wherein the third ring is made of plastic material having a coefficient of friction in the range between about 0.15 and 0.22.

11. The conveyor system of claim 7, further comprising:
a belt drive for transmitting rotating power to at least one of the pulleys;

second pulleys spaced mutually and engageable by the belt drive; and second roller assemblies, each second roller assembly aligned with one of the second pulleys and including a first ring driveably connected to said one of the second pulleys, a second ring surrounding the first ring, and a third ring located radially between and contacting the first and second rings, alternately permitting and preventing rotation of the second ring relative to the first ring depending on a magnitude of a rotational drive engagement between the third ring and the second ring.

* * * * *